(12) United States Patent
D'Allaird

(10) Patent No.: US 9,691,301 B2
(45) Date of Patent: Jun. 27, 2017

(54) APPARATUS AND METHOD FOR TRAINING LOCAL ANESTHESIA TECHNIQUES IN DENTAL APPLICATIONS

(71) Applicant: Frank Joseph D'Allaird, Brentwood, TN (US)

(72) Inventor: Frank Joseph D'Allaird, Brentwood, TN (US)

( * ) Notice: Subject to any disclaimer, the term of this patent is extended or adjusted under 35 U.S.C. 154(b) by 0 days.

(21) Appl. No.: 15/171,272

(22) Filed: Jun. 2, 2016

(65) Prior Publication Data

US 2017/0140670 A1 May 18, 2017

Related U.S. Application Data

(60) Provisional application No. 62/254,829, filed on Nov. 13, 2015.

(51) Int. Cl.
*G09B 23/28* (2006.01)

(52) U.S. Cl.
CPC .................. *G09B 23/283* (2013.01)

(58) Field of Classification Search
USPC .............. 434/262, 263, 267, 268, 272, 273; 446/296, 472
See application file for complete search history.

(56) References Cited

U.S. PATENT DOCUMENTS

| | | | | |
|---|---|---|---|---|
| 4,030,235 A * | 6/1977 | Terzian | ..................... | A63H 3/52 446/295 |
| 4,075,782 A * | 2/1978 | Neuschatz | ............. | A63H 3/001 434/267 |
| 4,194,318 A * | 3/1980 | Watanabe | .............. | A63H 17/26 446/270 |
| 4,231,181 A * | 11/1980 | Fabricant | ............. | G09B 23/283 434/264 |
| 8,714,984 B2 * | 5/2014 | Mach | ...................... | A61M 5/20 434/267 |
| 8,932,252 B2 * | 1/2015 | Edwards | ................ | G06Q 10/00 434/262 |
| 9,390,626 B1 * | 7/2016 | Horowitz | ................. | G09B 5/00 |
| 2004/0161732 A1 * | 8/2004 | Stump | .................... | G09B 23/30 434/262 |
| 2008/0077054 A1 * | 3/2008 | Feuer | ....................... | A61B 1/32 600/591 |
| 2014/0127661 A1 * | 5/2014 | Yokoi | .................... | G09B 19/24 434/262 |
| 2015/0056591 A1 * | 2/2015 | Tepper | ............... | A61B 10/0048 434/262 |
| 2015/0206456 A1 * | 7/2015 | Foster | .................. | G09B 23/285 434/262 |
| 2015/0248848 A1 * | 9/2015 | Yokoi | .................. | G09B 23/285 434/272 |

\* cited by examiner

*Primary Examiner* — Kurt Fernstrom
(74) *Attorney, Agent, or Firm* — Dunlap Bennett & Ludwig PLLC

(57) ABSTRACT

A safe needle for instructional use includes a bead affixed to the penetrating needle tip of a dental anesthetic needle. The safe needle allows unlimited practice of pre-invasive technique without the stress and safety issues of using an actual needle.

20 Claims, 2 Drawing Sheets

APPARATUS AND METHOD FOR TRAINING LOCAL ANESTHESIA TECHNIQUES IN DENTAL APPLICATIONS

CROSS-REFERENCE TO RELATED APPLICATION

This application claims the benefit of priority of U.S. provisional application No. 62/254,829, filed Nov. 13, 2015, the contents of which are herein incorporated by reference.

BACKGROUND OF THE INVENTION

The present invention relates to apparatus and methods of local anesthesia injection techniques in dentistry, and more particularly to training techniques for dental and dental hygiene students to learn proper local anesthesia injection procedures.

Standard dental injection techniques consist of a complex, multi-step pre-penetration phase and a blind post-penetration phase that is dependent on proper implementation of phase one. The invention addresses all steps in phase one. FIG. 3 is summary of common steps in each phase. Current instructional methods for training dental students in the proper injection procedures for administering local anesthesia to a student patient involves the use of sharp dental injection needles. This creates great anxiety in both the student and the patient. It also presents an environment for producing injury to one or both of the patient and student. Accordingly, this limits the student's ability to practice pre-penetration procedures to just a few attempts for each of the different dental injection techniques. Since acute anxiety has been demonstrated to dramatically decrease comprehension and retention in students, use of the safe needle enhances and accelerates the learning process.

To alleviate this concern, some dental schools have advocated the use of simulated teaching environment, such as mouth models. While models may be anatomically acceptable, they cannot replicate the complex and varied anatomy or intraoral environment, which includes tongue and tissue movement, saliva or patient compliance. Moreover, video instruction, demonstrations, computer simulations cannot create the muscle memory needed to train dental students for the complexity of performing intra-oral injections.

As can be seen, there is a need for an improved apparatus and method for training dental and hygiene students on the proper application of local anesthesia injection techniques in a calm, relaxed atmosphere.

SUMMARY OF THE INVENTION

In one aspect of the present invention, a training submucosal needle is provided having an elongate rod with a first end and a second end; a bead encapsulating a tip of the first end; and a coupling attached to the second end, the coupling adapted to be received on the end of a syringe. In some embodiments, the needle includes indicia visible on an outer surface of the bead indicating a radial orientation of the elongate rod. In some embodiments, the first end has a beveled needle tip and the indicia indicates the radial orientation of the beveled needle tip. In some embodiments, the elongate rod is solid, while in others the elongate rod is hollow. In other embodiments the elongate rod is formed of a semi-rigid material.

Other aspects of the invention include methods of training, instruction, practice and evaluation of the performance of anesthetic administration techniques. The method includes providing a student with a safe needle having an elongate rod having a first end and a second end; a bead encapsulating a tip of the first end; and a coupling attached to the second end, the coupling adapted to be received on the end of a syringe. The method may also include attaching the safe needle to a syringe.

Instructional aspects of the invention may include one or more of the following steps:

a) instructing a student on one or more procedures for syringe preparation utilizing the safe needle;

b) instructing a student on assuming a syringe neutral position utilizing the safe needle;

c) instructing a student to orient a body and a head position of a patient for administration of an anesthesia to a targeted nerve utilizing the safe needle;

d) instructing a student to take a neutral position to an oral cavity of a patient;

e) instructing a student to perform an unobtrusive retraction of a patient's lips, by grasping the lips between a thumb and a finger of the student;

f) instructing a student to position the syringe for proper orientation with respect to a targeted insertion point;

g) instructing a student on proper needle orientation and angulation for a target nerve; or h) instructing a student on aspiration and anesthetic injection delivery while the student maintains the safe needle in contact with an intra-oral tissue of the patient.

In yet other aspects of the invention, student training according of the present invention include practicing anesthetic techniques utilizing the safe needle.

Another aspect of the invention includes evaluating a student's proficiency in performing an anesthetic technique utilizing the safe needle.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a safe needle that may be operatively attached to a local anesthesia dental syringe. The safe needle according to the present invention is intended for use as a training aid in teaching dental and hygiene students the proper technique for the administration of local anesthesia. Aspects of the present invention provide a modified tip so as to render the normally sharp dental anesthetic needle to a blunt ended instrument.

Figure 1:
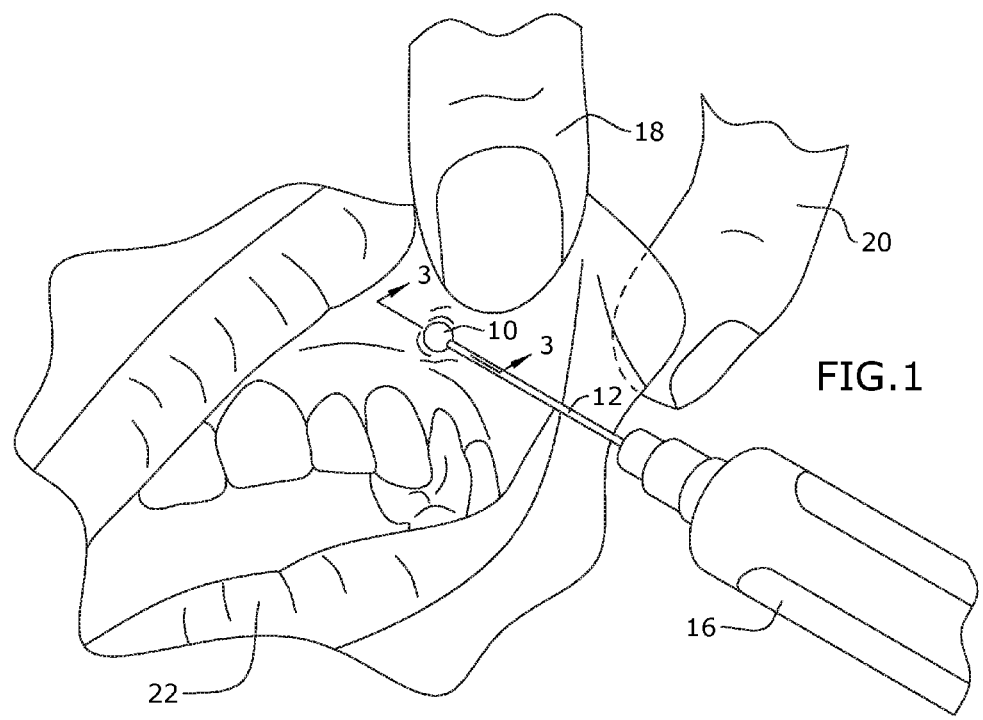
FIG. 1 is a perspective view of an embodiment of a dental anesthesia training syringe of the present invention shown in use.
Figure 2:
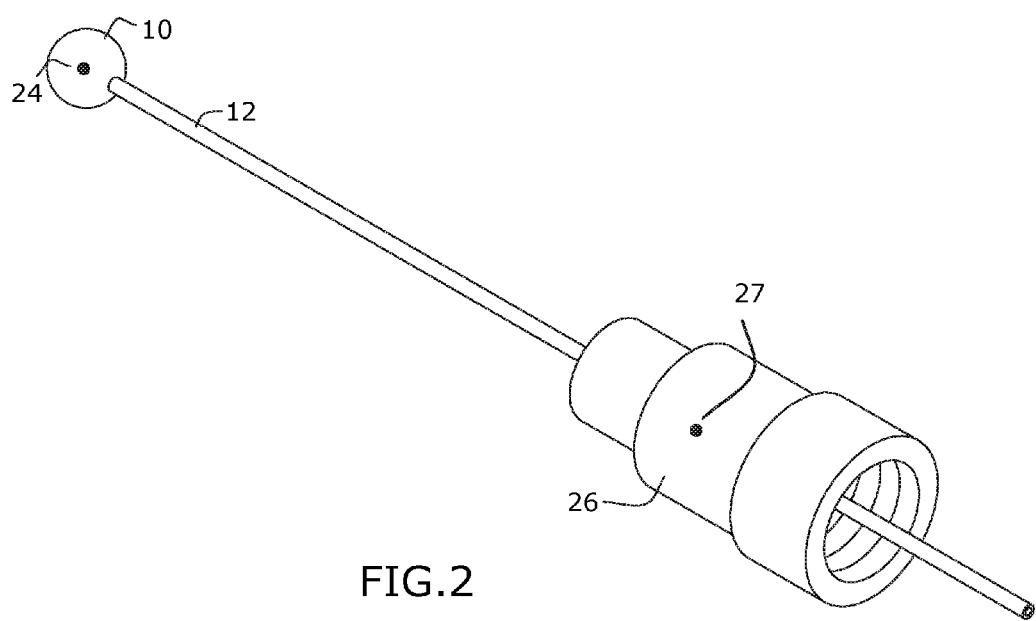
FIG. 2 is a perspective view of an embodiment of the dental anesthesia training needle.
Figure 3:
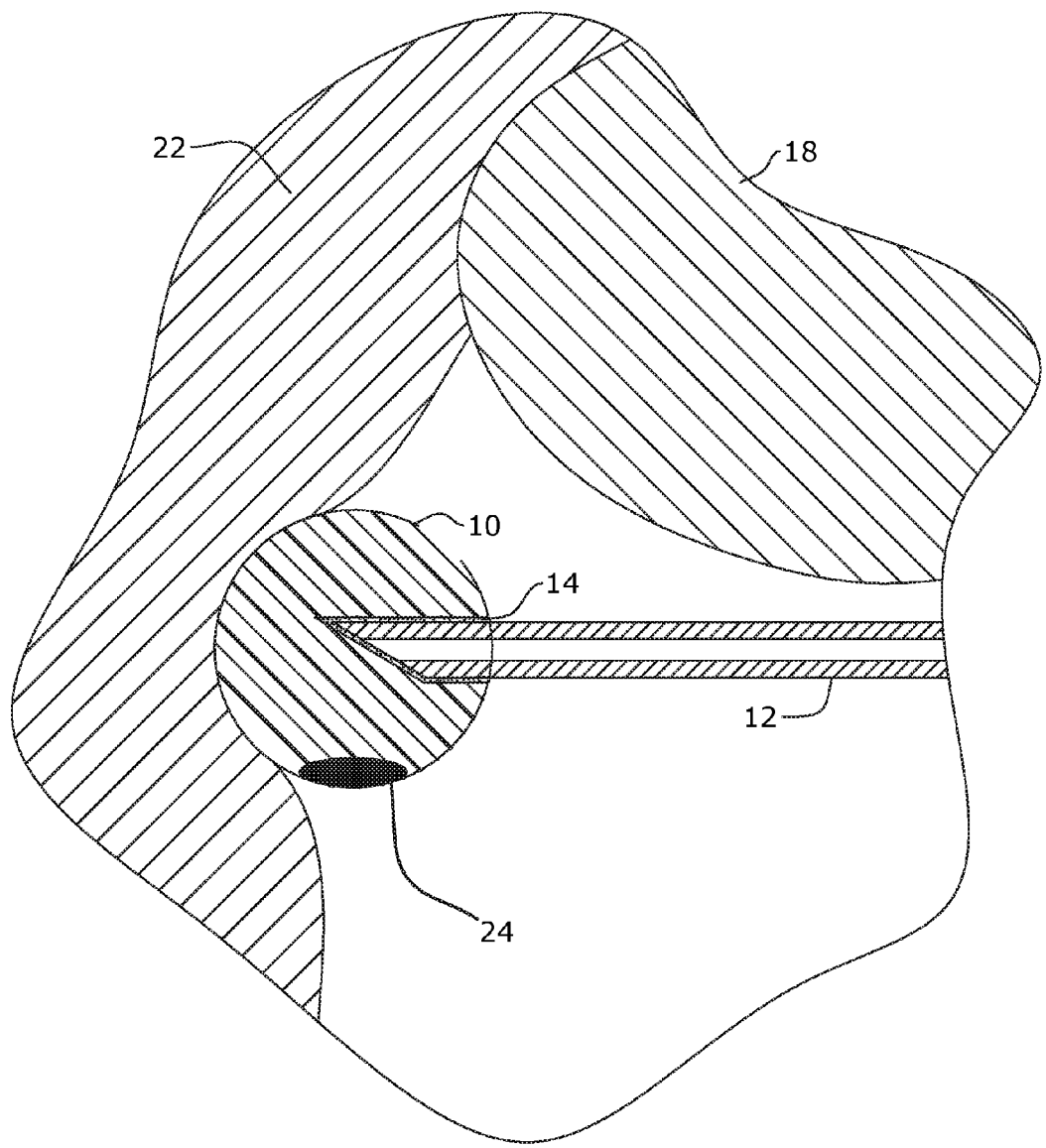
FIG. 3 Is a detail sectional view of a dental anesthesia training needle tip taken from line 3-3 in FIG. 1.

As seen in reference to FIG. 1 a local anesthesia dental syringe 16 is fitted with a safe needle 12, which may be any conventional dental anesthesia needle, having various gauges, lengths, and other characteristics relating to the patient, administration site, targeted nerve and anesthetic drug delivered. The tip 13 may be modified by the application of a bead 10 of material, such as an acrylic resin, polished stone, wood, glass or other suitable material to encapsulate and cover the sharpened needle tip 13.

Since the safe needle 12 may not need to convey an anesthesia compound, the safe needle 12 may also be formed as an elongate solid rod 12. The rod 12 may be formed having a diameter and length corresponding to a variety of submucosal needle gauges and other characteristics relating to the patient, administration site, targeted nerve and anesthetic drug delivered. A first end of the rod 12 is formed with a bead 10 that encapsulates the tip of the rod 12. A second end of the rod 12 is provided with a coupling 26 adapted to be received on the end of a syringe 16. Typically, the coupling 26 is threadingly received on the end of the syringe 16. The second end of the rod 12 will extend through the coupling 26 by a distance to sufficient to engage with the tip of the syringe to facilitate alignment of the coupling 26 with the syringe tip.

In a preferred embodiment, the length of the second end of the rod 12 extending through the coupling 26 will be shortened from that of a conventional dental needle such that the second end of the rod 12 will not penetrate the membrane of a dental anesthesia cartridge in the syringe. This will permit the dental student the opportunity to configure the syringe for an actual injection procedure with a dental anesthesia. The student may then initially practice their injection technique with the training needle. The student may then switch to a conventional administration needle, which may then penetrate the protective membrane for administration of the dental anesthesia. This will preserve the sterility of the anesthesia during practice and leave the syringe in a condition for administration via a conventional needle.

Like the conventional anesthesia needle, the rod 12 may be formed of a metallic material, such as stainless steel. Alternatively, to enhance subject safety in the training environment, the rod may be formed of a semi-rigid material, such that the rod 12 may flex if an excessive force is applied by the student.

To preserve the sterility of the dental anesthesia vial contained within the dental syringe, the length of the rod 12 extending through the coupling may be trimmed or shortened from that of a conventional dental anesthesia needle. The length of the rod 12 should be trimmed such that the rod end will not penetrate the anesthesia membrane when the safe needle is coupled to the syringe.

As with conventional dental anesthesia needles, the safe needle 12 may also include a protective cover or sleeve (not shown) so that the student may train and develop the muscle memory and routine of practicing proper sharps procedures for the avoidance of unintended needle sticks as well as sharps disposal procedures.

The contemplated safe needle 12 is intended as a single use device, though, in the context of the anticipated use, the same safe needle 12 may be used for multiple iterations in a training session on a single person serving as the dental student's training aid, whether that person is a patient, a volunteer, or perhaps another student in the class. The needle 12 should be disposed of between training sessions.

Preferably, the bead 10 is formed with a generally rounded or spherical shape so that the bead 10 may be safely placed against the intraoral tissues 26 of a person 22 without harming the person 22. In addition, the rounded or spherical shape of the bead 10 permits the dental student to safely reorient or realign the submucosal syringe 16 and needle 12 responsive to an instructor's guidance, either verbally or by physically guiding a student's hand. With the spherical shape, the bead 10 also permits the student to initiate and maintain contact with the person's tissues from an initial orientation as well as allowing for rotation of the bead 10 while the syringe 16 and needle 12 are reoriented without causing any tissue damage.

In a preferred embodiment, the bead 10 is permanently attached to the needle tip 13 so as to avoid inadvertent reuse, or unintended use of the training device in a clinical use. The bead 10 and device may also be formed from materials that would permit sterilization of the apparatus for subsequent reuse as a training aid.

The bead 10 may also be provided with a visual indicia 24 of a bevel identifier. The bevel identifier identifies the location or orientation of the beveled tip 13 with respect to the dental anesthesia needle 12. Since the anesthesia is delivered to the injection site laterally through the beveled tip 13 of the dental anesthesia needle 12, the bevel identifier 24 allows the student to properly identify the orientation of the beveled tip 13 with respect to the syringe 16 body. The coupler 26 may also be provided with a corresponding visual indicator 27 that is aligned with the bevel and the visual indicia 24 of the bead 10. Accordingly, the student is provided a visual indicator to ensure that they have properly oriented the anesthesia needle 12 in the correct alignment with the syringe 16 body for the particular nerve they are targeting.

By having the correct alignment of the bevel tip 13 with the syringe 16 before inserting the needle 12 into the oral cavity, the student can ensure the correct alignment of their syringe operating hand, the syringe 16, and the bevel 13 of the needle 12 during pre-penetration positioning of the needle 12, so that after penetration, the anesthesia may be delivered to effectively anesthetize the targeted nerve.

Another aspect of the invention includes a method of teaching a dental student local dental anesthesia techniques. As indicated previously, oral cavity simulation devices and oral models cannot replicate the complex anatomy or intraoral environment, including: tongue and tissue movement, saliva or patient compliance. Similarly, instructional videos, demonstrations, computer simulations cannot create or develop the muscle memory that the student needs for the complexity of administering intra-oral injections.

The method of instruction includes providing a student with a safe needle 12 having a beaded protective tip 10. The safety needle 12 allows the student to replicate the motions and environment they would encounter while performing an actual local anesthesia dental injection. The student may utilize the safe needle 12 to practice on a training subject (referred to herein as the patient) with or without guidance and evaluation of their technique from an instructor. The patient may be a person, or perhaps animal, on which the student will practice anesthesia administration techniques utilizing the safe needle.

As a preliminary or preparatory step, the student would affix the safe needle on a syringe 16, providing the student training on the procedures for syringe and needle assembly and preparation, to include sharps procedures. The student may then practice proper uncapping of the needle 12 as well as assuming a syringe neutral position. The student would then confirm or reorient the patient's body and head position for administration of the anesthesia to a targeted nerve.

The student would then take a neutral position to the patient's oral cavity and perform an effective, unobtrusive retraction of the patient's lips 22, by grasping between their thumb 18 and forefinger 20. The student would then position the syringe 16 for proper orientation of the bevel, as indicated by the bevel identifier 24, select an insertion point. The student would then practice or demonstrate proper needle orientation and angulation for the target nerve as well as syringe 16 barrel position and hand position on the syringe 16. The method of the present invention also allows the student to practice or demonstrate proper stabilization technique prior to and during tissue penetration.

While the bead 10 precludes tissue penetration, the method and apparatus of the present invention still allows the student the opportunity to practice aspiration and anesthetic injection delivery while maintaining the bead 10 in contact with the patient's intra-oral tissues during these aspects of anesthesia administration. Similarly, while the bead 10 precludes actual withdrawal of a needle from the patient's tissues, the method allows for practice and demonstration of breaking contact from the tissue and safe withdrawal of the needle 12 from the patient's oral cavity, at which point the student returns to a neutral position. From here, the student may practice or demonstrate safe recapping of the needle 12 and may do the same for other sharps procedures.

The student may then practice the technique by making contact by the bead 10 with the intra-oral tissues of another person 22. The student may make repetitive contacts with the tissues, until the student becomes proficient and develops the muscle memory for performing the anesthesia administration procedure.

The method may also include the student performing the technique under supervision of an instructor. A safe needle 12 allows unlimited practice of pre-invasive technique without the stress and safety issues of using an actual needle. It can be used repetitively on same patient during a training session or on different patients after proper sterilization.

It should be understood, of course, that the foregoing relates to exemplary embodiments of the invention and that modifications may be made without departing from the spirit and scope of the invention as set forth in the following claims.

What is claimed is:

1. A training submucosal needle comprising:
   an elongate rod having a first end and a second end, the elongate rod having a diameter and a length corresponding to that of a dental local anesthetic injection needle;
   a bead encapsulating a tip of the first end; and
   a coupling attached to the second end, the coupling adapted to be received on the end of a syringe.

2. The training submucosal needle of claim 1, further comprising:
   indicia visible on an outer surface of the bead indicating a radial orientation of the elongate rod.

3. The training submucosal needle of claim 2, wherein the first end has a beveled needle tip encapsulated by the bead.

4. The training submucosal needle of claim 3, wherein the indicia indicates the radial orientation of the beveled needle tip.

5. The submucosal needle of claim 4, wherein the elongate rod is solid.

6. The training submucosal needle of claim 4, wherein the elongate rod is hollow.

7. The training submucosal needle of claim 6, wherein the elongate rod is formed of a semi-rigid material.

8. The training submucosal needle of claim 4, further comprising:
   a syringe attached to the coupling.

9. A method, comprising:
   affixing a safe needle to a syringe, the safe needle comprising:
      an elongate rod having a first end and a second end, the elongate rod having a diameter and a length corresponding to that of a dental local anesthetic injection needle;
      a bead encapsulating a tip of the first end; and
      a coupling attached to the second end, the coupling adapted to be received on the end of the syringe.

10. The method of claim 9, further comprising:
    orienting a body and a head position of a patient for a simulated administration of an anesthesia to a targeted nerve utilizing the safe needle.

11. The method of claim 9, further comprising:
    positioning the syringe to place the safe needle in an orientation with respect to a targeted insertion point corresponding to the targeted nerve.

12. The method of claim 11, further comprising:
    positioning the syringe at an angulation for the targeted nerve.

13. The method of claim 9, further comprising:
    placing the bead of the safe needle in contact with an intra-oral tissue of the patient according to the orientation and the angulation.

14. A training submucosal needle comprising:
    an elongate rod having a first end and a second end;
    a bead encapsulating a tip of the first end, indicia visible on an outer surface of the bead indicating a radial orientation of the elongate rod; and
    a coupling attached to the second end, the coupling adapted to be received on the end of a syringe.

15. The training submucosal needle of claim 14, wherein the first end has a beveled needle tip encapsulated by the bead.

16. The training submucosal needle of claim 15, wherein the indicia indicates the radial orientation of the beveled needle tip.

17. The training submucosal needle of claim 14, wherein the elongate rod is formed of one of a rigid or a semi-rigid material.

18. The training submucosal needle of claim 14, wherein the elongate rod is hollow.

19. The training submucosal needle of claim 14, further comprising:
    a syringe attached to the coupling.

20. The training submucosal needle of claim 14, wherein a length of the second end of the elongate rod extending through the coupling will not penetrate a membrane of an anesthesia cartridge carried in the syringe.

* * * * *